(12) United States Patent
Burke (10) Patent No.: US 10,865,838 B2
(45) Date of Patent: Dec. 15, 2020

(54) SWITCHABLE THREE-MODE CLUTCH (71) Applicant: Schaeffler Technologies AG & Co. KG, Herzogenaurach (DE)

(72) Inventor: Peter Burke, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 145 days.

(21) Appl. No.: 16/278,772

(22) Filed: Feb. 19, 2019

(65) Prior Publication Data
US 2020/0263742 A1 Aug. 20, 2020

(51) Int. Cl.
*F16D 41/12* (2006.01)
*F16D 41/14* (2006.01)
*F16D 41/08* (2006.01)
*F16D 41/06* (2006.01)
*F16D 41/16* (2006.01)
*F16D 15/00* (2006.01)

(52) U.S. Cl.
CPC .............. *F16D 41/12* (2013.01); *F16D 41/06* (2013.01); *F16D 41/14* (2013.01); *F16D 41/16* (2013.01); *F16D 15/00* (2013.01); *F16D 41/082* (2013.01)

(58) Field of Classification Search
CPC ........ F16D 41/12; F16D 41/14; F16D 41/082; F16D 41/06; F16D 41/16; F16D 15/00
See application file for complete search history.

(56) References Cited

U.S. PATENT DOCUMENTS

| 6,244,965 | B1 | 6/2001 | Klecker et al. |
| 6,481,551 | B1 | 11/2002 | Ruth |
| 8,083,042 | B2 * | 12/2011 | Samie ............... F16D 41/14 192/43.1 |
| 9,109,636 | B2 | 8/2015 | Kimes et al. |
| 9,121,454 | B2 | 9/2015 | Pawley |
| 9,127,723 | B2 * | 9/2015 | Fujiwara ............ F16D 41/067 |
| 10,697,503 | B1 * | 6/2020 | Burke ................. F16D 41/04 |
| 10,711,853 | B2 * | 7/2020 | Hand .................. F16D 41/14 |
| 2010/0122883 | A1 * | 5/2010 | Bartos ................ F16D 41/16 192/43.1 |
| 2018/0266502 | A1 | 9/2018 | Shioiri et al. |
| 2018/0274604 | A1 | 9/2018 | Ince et al. |

* cited by examiner

Primary Examiner — Tinh Dang (57) ABSTRACT

A three-mode clutch, including: an inner ring; an outer ring including a pocket; a cage radially disposed between the inner and outer rings, rotatable with respect to the outer ring, and including a ramp sloping radially inwardly; and a pawl including a portion disposed in the pocket. In a locked mode of the clutch, the ramp is in contact with the pawl and the inner and outer rings are non-rotatably connected. In a one-way mode of the clutch, the cage is in contact with the pawl and relative rotation of the inner ring with respect to the outer ring is enabled only in a first rotational direction. In a freewheel mode of the clutch, the ramp is in contact with the pawl and the inner ring is rotatable with respect to the outer ring in the first rotational direction and in a second rotational direction opposite the first rotational direction.

20 Claims, 8 Drawing Sheets

SWITCHABLE THREE-MODE CLUTCH

TECHNICAL FIELD

The present disclosure relates to a clutch switchable among a locked mode, a one-way mode, and a freewheel mode.

BACKGROUND

Known ratcheting clutches are switchable between a freewheel mode and one or more one-way modes.

SUMMARY

According to aspects illustrated herein, there is provided a switchable three-mode clutch, including: an inner ring; an outer ring including a pocket; a cage radially disposed between the inner ring and the outer ring, rotatable with respect to the outer ring, and including a ramp sloping radially inwardly; and a pawl including a portion disposed in the pocket. In a locked mode of the switchable three-mode clutch the ramp is in contact with the pawl and the inner ring and the outer ring are non-rotatably connected. In a one-way mode of the switchable three-mode clutch the cage is in contact with the pawl and relative rotation of the inner ring with respect to the outer ring is enabled only in a first rotational direction. In a freewheel mode of the switchable three-mode clutch the ramp is in contact with the pawl and the inner ring is rotatable with respect to the outer ring in the first rotational direction and in a second rotational direction opposite the first rotational direction.

According to aspects illustrated herein, there is provided a switchable three-mode clutch, including: an inner ring; an outer ring including a pocket; a cage located between the inner ring and the outer ring, including a resilient element, and rotatable with respect to the outer ring by an actuator; and a pawl including a portion disposed in the pocket. In a locked mode of the switchable three-mode clutch the resilient element is free of contact with the pawl and the pawl and the inner ring are non-rotatably connected. In a one-way mode of the switchable three-mode clutch the resilient element urges the pawl into contact with the inner ring and relative rotation of the inner ring with respect to the outer ring is enabled only in a first rotational direction.

According to aspects illustrated herein, there is provided a switchable three-mode clutch, including: an inner ring; an outer ring including a pocket; a cage including a ramp extending radially inwardly in a first rotational direction; and a pawl including a portion disposed in the pocket. In a locked mode of the switchable three-mode clutch the ramp is in contact with the pawl and displaces the pawl into non-rotatable connection with the inner ring. In a one-way mode of the switchable three-mode clutch the ramp is free of contact with the pawl and relative rotation of the inner ring with respect to the outer ring is enabled only in a second rotational direction opposite the first rotational direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
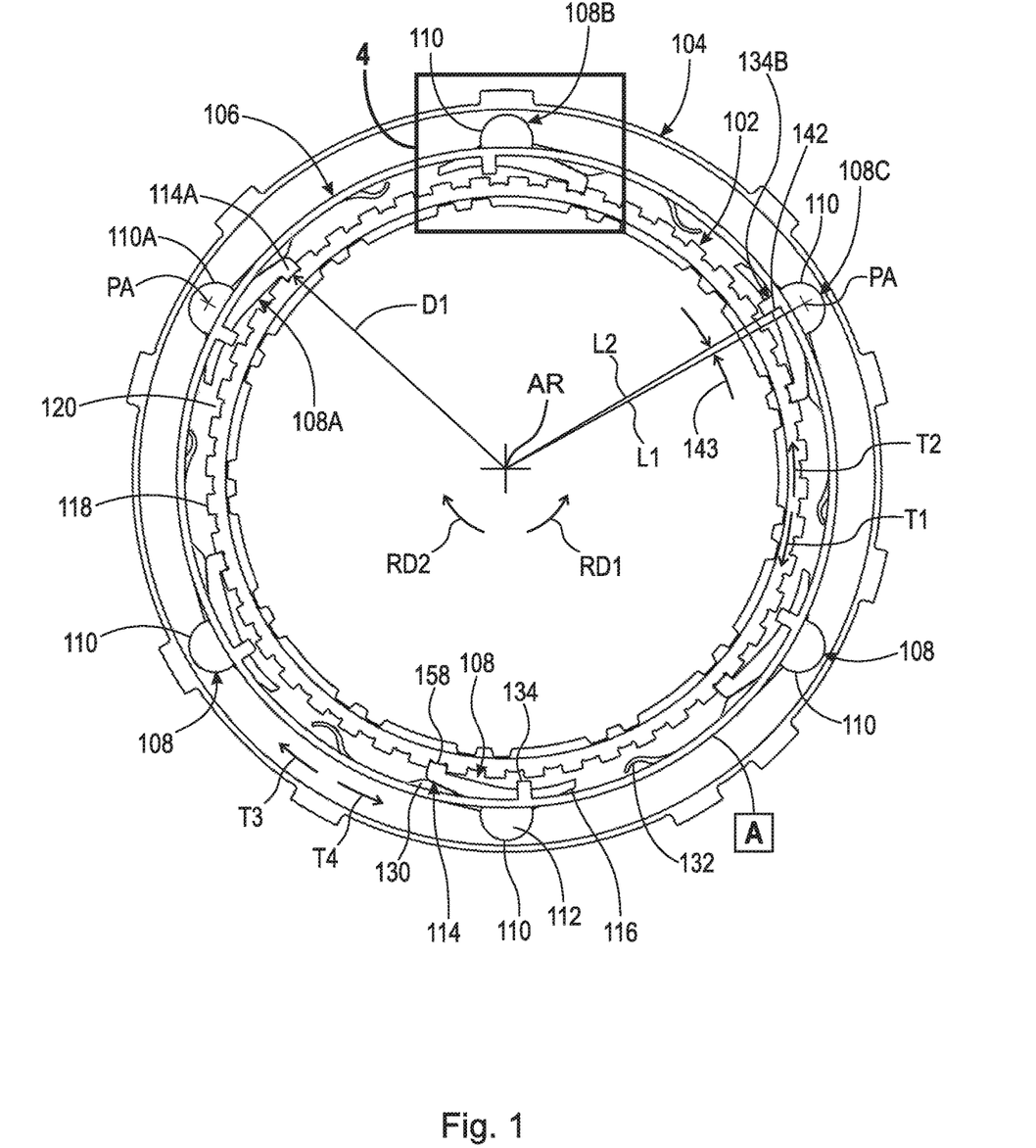
FIG. 1 is a front view of a switchable three-mode clutch in a locked mode.

FIG. 1 is a front view of switchable three-mode clutch 100 in a locked mode.

Figure 2:
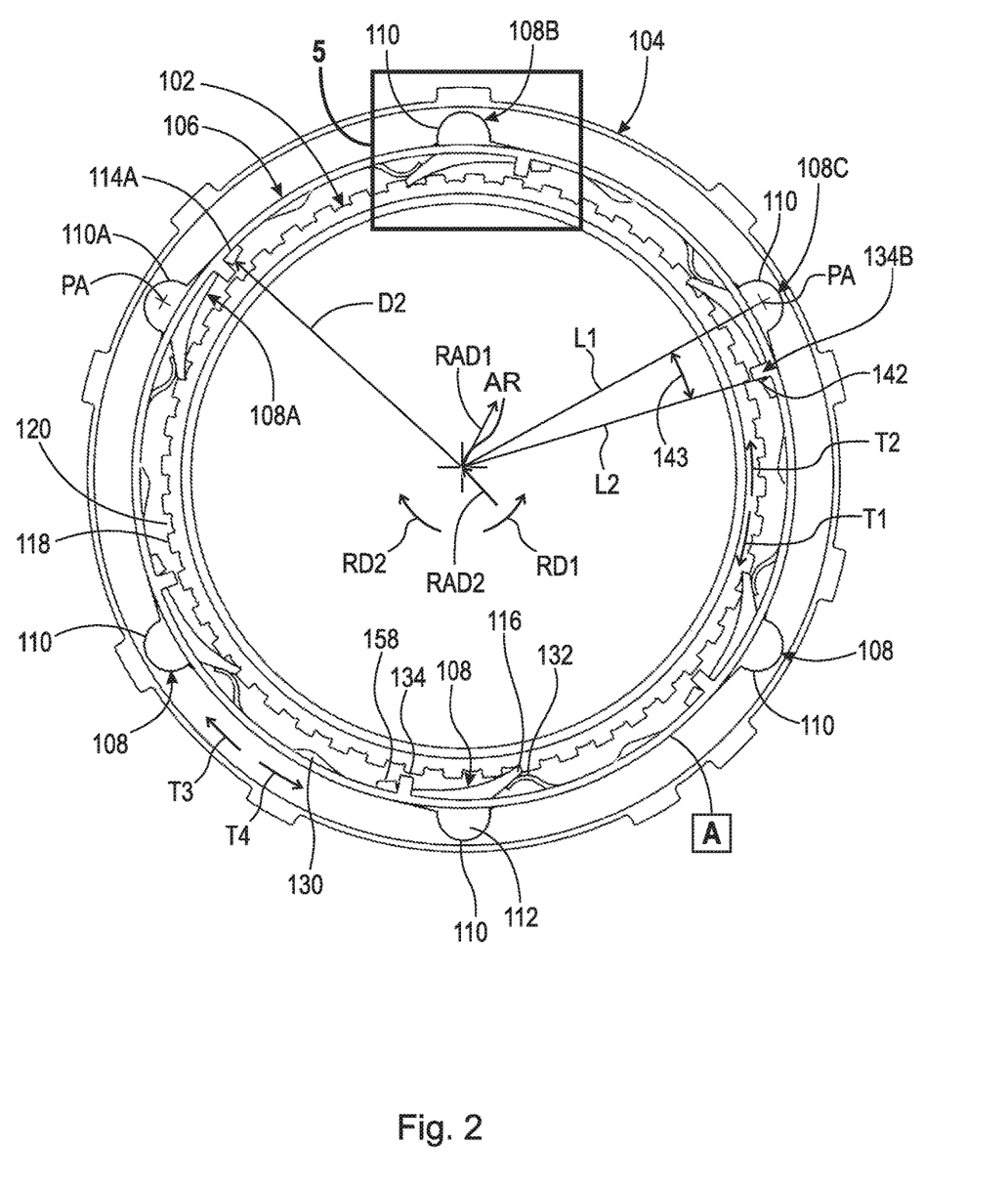
FIG. 2 is a front view of the switchable three-mode clutch shown in FIG. 1 in a one-way mode.

FIG. 2 is a front view of switchable three-mode clutch 100 shown in FIG. 1 in a one-way mode.

Figure 3:
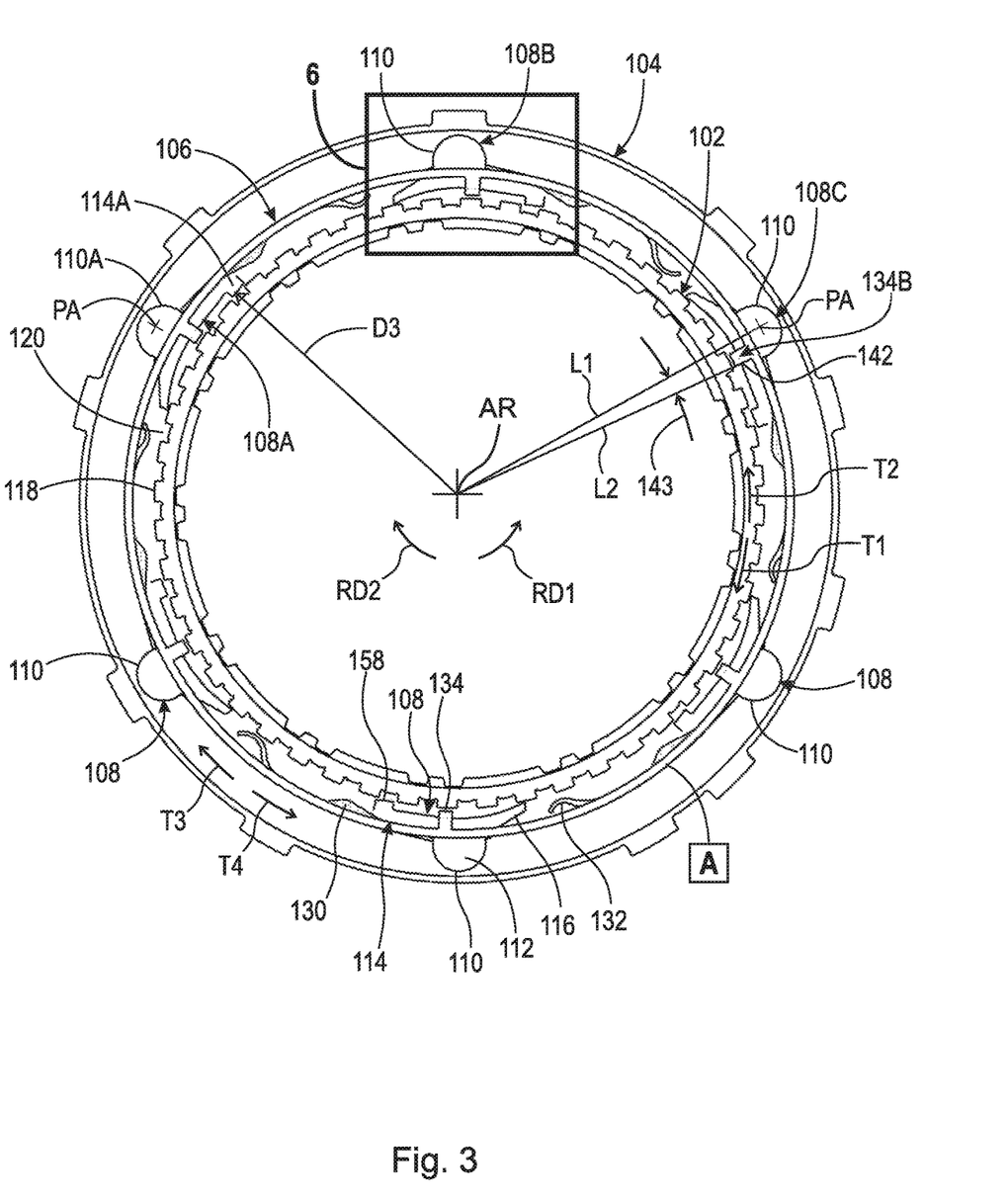
FIG. 3 is a front view of the switchable three-mode clutch shown in FIG. 1 in a freewheel mode.

FIG. 3 is a front view of switchable three-mode clutch 100 shown in FIG. 1 in a freewheel mode. The following should be viewed in light of FIGS. 1 through 3. Three-mode clutch 100 includes: inner ring 102; outer ring 104; annular cage 106 radially disposed between inner ring 102 and outer ring 104; and pawls 108. Outer ring 104 includes pockets 110. Cage 106 is rotatable with respect to outer ring 104 in opposite rotational directions RD1 and RD2. Directions RD1 and RD2 are referenced with respect to axis of rotation AR for clutch 100. Each pawl 108 includes portion 112 disposed in a respective pocket 110. Each pawl 108 includes: circumferential end 114 including the portion of the pawl 108 extending furthest in rotational direction RD2; and circumferential end 116 including the portion of the pawl 108 extending furthest in rotational direction RD1.

Portions 112 are circumferentially and radially fixed with respect to outer ring 104. That is, portions 112 are pivotable about axis PA within pockets 110, but cannot shift positions with respect to outer ring 104 in rotational directions RD1 or RD2 or in radial directions RAD1 and RAD2. Stated otherwise, portions 112 are non-rotatable with respect to outer ring 104 in directions RD1 and RD2. Directions RAD1 and RAD2 are orthogonal to axis AR and extend away from axis AR and extend toward axis AR, respectively. Each pivot axis PA is parallel to axis of rotation AR, passes through a respective pocket 110, and passes through a respective portion 112.

In the locked mode of three-mode clutch 100 shown in FIG. 1: each pawl 108 is pivoted to a first rotational position within the respective pocket 110 and with respect to outer ring 104; each pawl 108 is in contact with inner ring 102; and inner ring 102 and outer ring 104 are non-rotatably connected. For example, inner ring 102 and outer ring 104 are non-rotatably connected for: torque T1 applied to inner ring 102 in circumferential direction RD2; torque T2 applied to inner ring 102 in circumferential direction RD1; torque T3 applied to outer ring 104 in circumferential direction RD2; and torque T4 applied to outer ring 104 in circumferential direction RD1.

By "non-rotatably connected" components, we mean that: the components are connected so that whenever one of the components rotates, all the components rotate; and relative rotation between the components is not possible. Radial and/or axial movement of non-rotatably connected components with respect to each other is possible, but not required.

In the one-way mode of three-mode clutch 100 shown in FIG. 2: each pawl 108 is pivoted to a second rotational position within the respective pocket 110 and with respect to outer ring 104; pawls 108 are in contact with inner ring 102; and relative rotation of inner ring 102 with respect to outer ring 104 is enabled only in rotational direction RD1. For example: inner ring 102 and outer ring 104 are non-rotatably connected for torque T1 and torque T4; and relative rotation of inner ring 102, with respect to outer ring 104 in rotational direction RD1 is enabled for torque T2 and torque T3.

In the freewheel mode of three-mode clutch 100 shown in FIG. 3: each pawl 108 is pivoted to a third rotational position within the respective pocket 110 and with respect to outer ring 104; rotation between inner ring 102 and outer ring 104 in rotational directions RD1 and RD2 is enabled; and pawls 108 are free of contact with inner ring 102.

Actuator A, shown schematically in FIG. 1, is arranged to rotate cage 106 with respect to outer ring 104 in directions RD1 and RD2 and to shift clutch 100 among the locked, one-way, and freewheel modes. In an example embodiment, clutch 100 includes actuator A.

For purposes of presentation, outer ring 104 is circumferentially fixed in FIGS. 1 through 3. However, as is apparent from the above discussion and as is further discussed below, clutch 100 can: operate with torque applied to inner ring 102 for transmission to outer ring 104 in the locked and one-way modes; or operate with torque applied to outer ring 104 for transmission to inner ring 102 in the locked and one-way modes.

Figure 4:
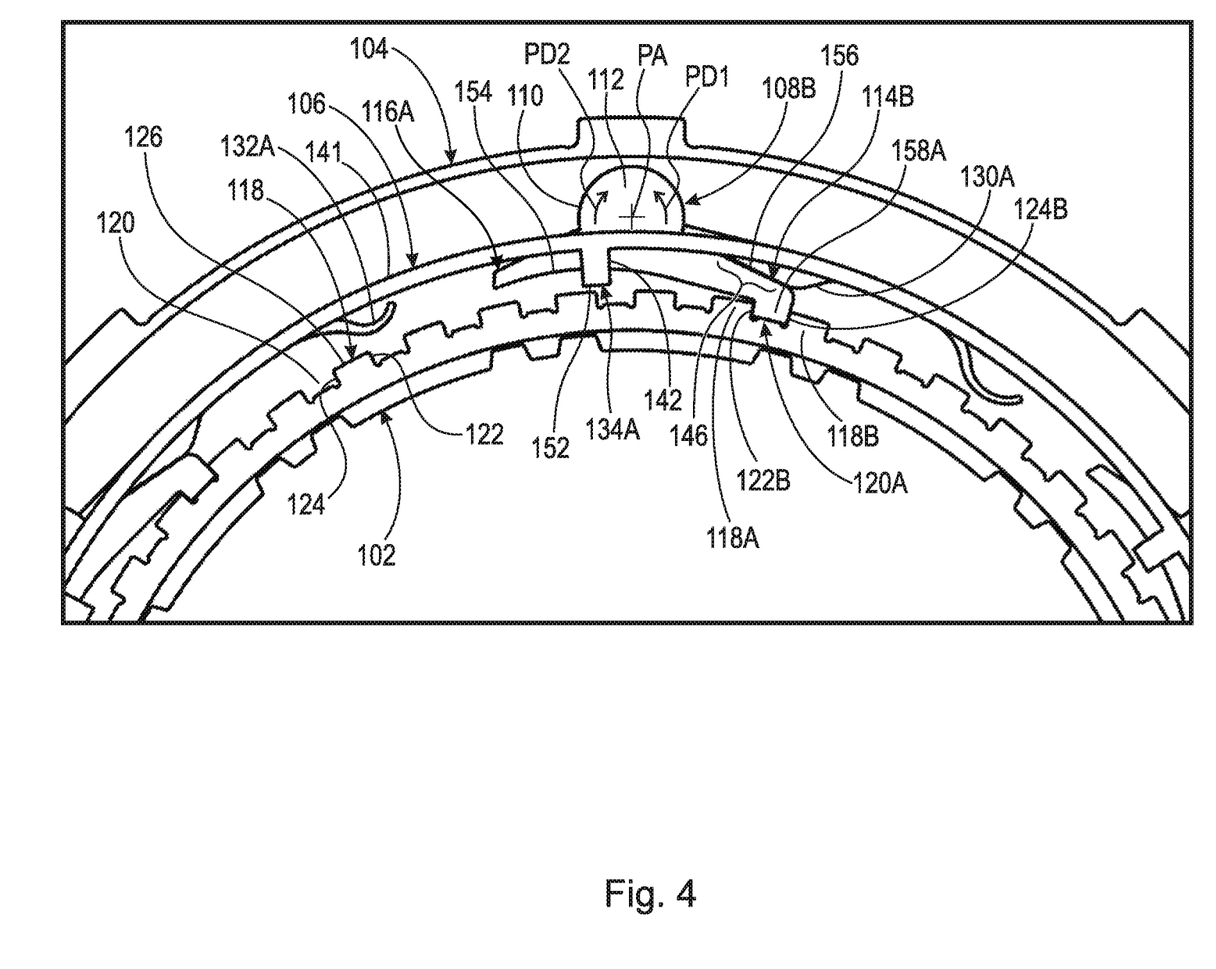
FIG. 4 is a detail of area 4 in FIG. 1.

FIG. 4 is a detail of area 4 in FIG. 1.

Figure 5:
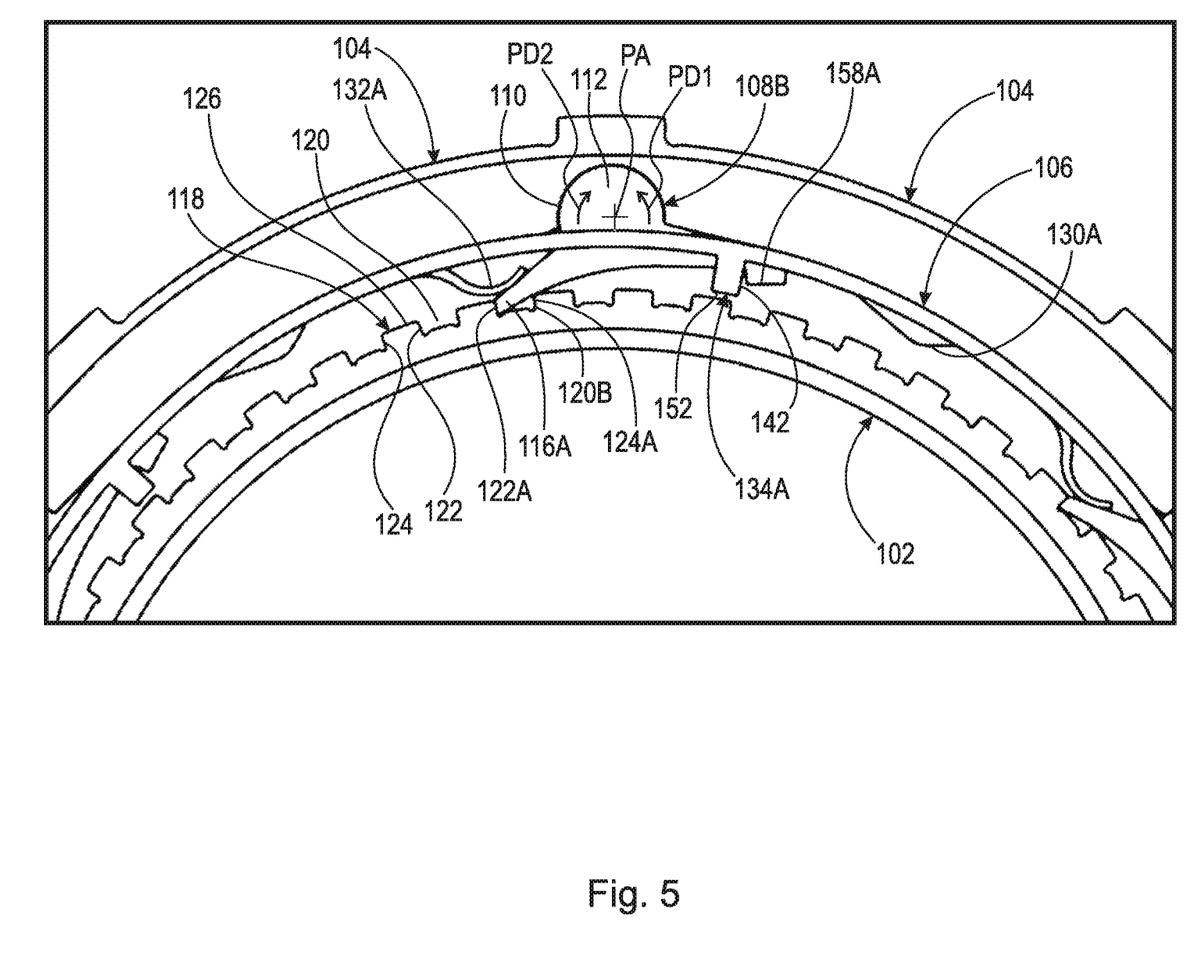
FIG. 5 is a detail of area 5 in FIG. 2.

FIG. 5 is a detail of area 5 in FIG. 2.

Figure 6:
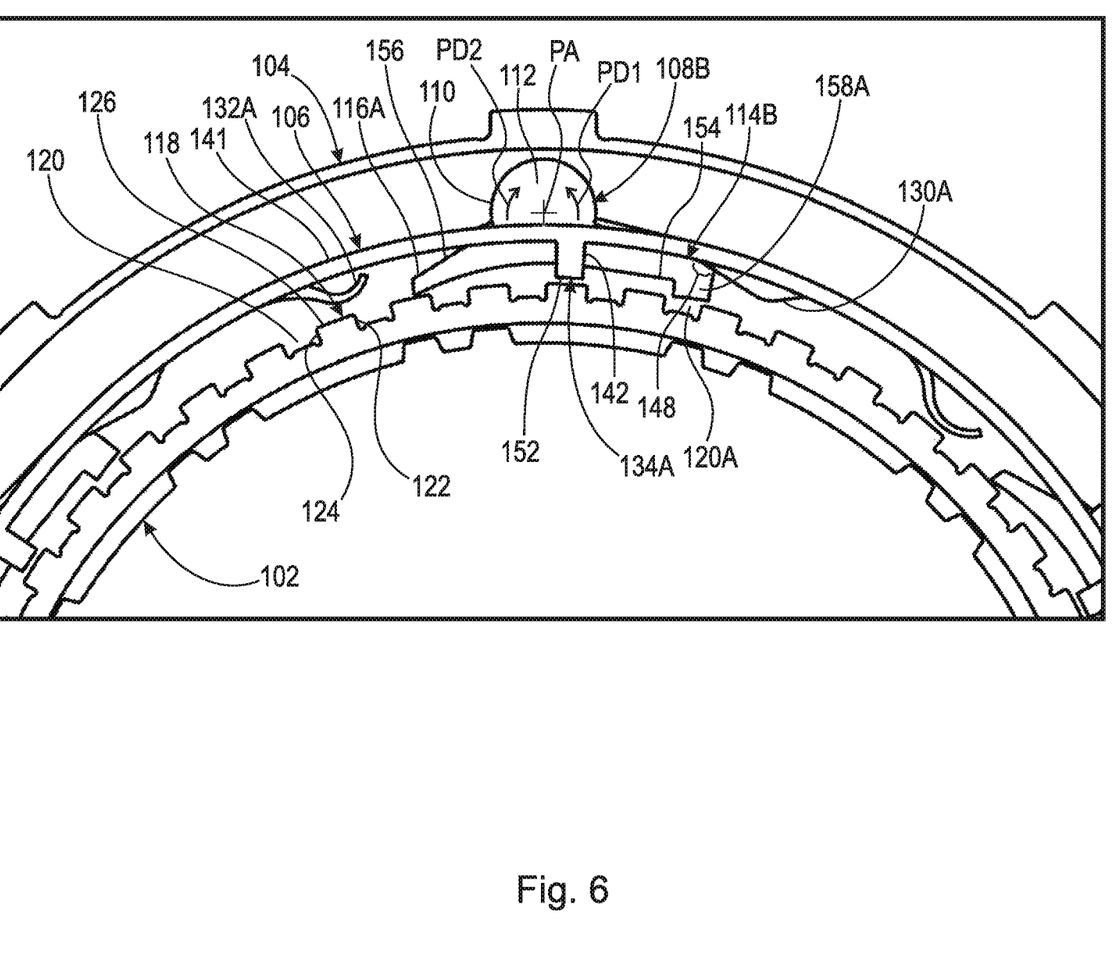
FIG. 6 is a detail of area 6 in FIG. 3.

FIG. 6 is a detail of area 6 in FIG. 3. The following should be viewed in light of FIGS. 1 through 6. The first, second, and third rotational positions of pawls 108 are different from each other. That is, in each of the first, second, and third rotational positions of pawls 108, pawls 108 are rotated to a different degree, or extent, within the respective pocket 110. The preceding differences are illustrated for example, by distances between circumferential ends 114 of pawls 108 and axis of rotation AR. As pawls 108 rotate, or pivot, within the respective pocket 110 to change the rotational positions of pawls 108 within the respective pocket 110, the distances between circumferential ends 114 of pawls 108 and axis of rotation AR change. For example, pawl 108A rotates, or pivots, within pocket 110A to change a rotational position of pawl 108A within pocket 110A. The pivoting of pawl 108A is illustrated by the differences between distances D1, D2, and D3, shown in FIGS. 1, 2, and 3 respectively, from end 114A of pawl 108A to axis AR. For example: distance D2 is greater than distances D1 and D3; and distance D3 is greater than distance D1.

In general, a reference character "[number][number][number][letter]" designates a specific example of an element labeled as "[number][number][number]." For example, pawl 108A is a specific example from among pawls 108.

Inner ring 102 includes: teeth 118 extending radially outwardly; and grooves 120. Each groove 120 is circumferentially disposed between a respective pair of circumferentially adjacent teeth 118. Stated otherwise, teeth 118 and grooves 120 alternate in direction RD1.

The discussion that follows is directed to pawl 108B. However, it should be understood that the discussion is applicable to each pawl 108 included in clutch 100. In the locked mode, circumferential ends 114 are disposed in respective grooves 120. For example, in FIGS. 1 and 4, circumferential end 114B is disposed in groove 120A. Thus, circumferential ends 114 and teeth 118 are aligned in direction RD1.

Each tooth 118 includes: wall 122 facing at least partly in rotational direction RD2; wall 124 facing at least partly in rotational direction RD1; and radially outer surface 126 connecting walls 122 and 124. In the one-way mode and for torques T1 and T4, at least one pawl 108, in particular at least one end 116, is disposed in a groove 120 and is in contact with a wall 122. For example, in FIGS. 2 and 5, end 116A of pawl 108B is disposed in groove 120B and is in contact with wall 122A. Stated otherwise wall 122A, end 116A, and wall 124A are sequentially aligned, or disposed, in direction RD2.

Figure 7:
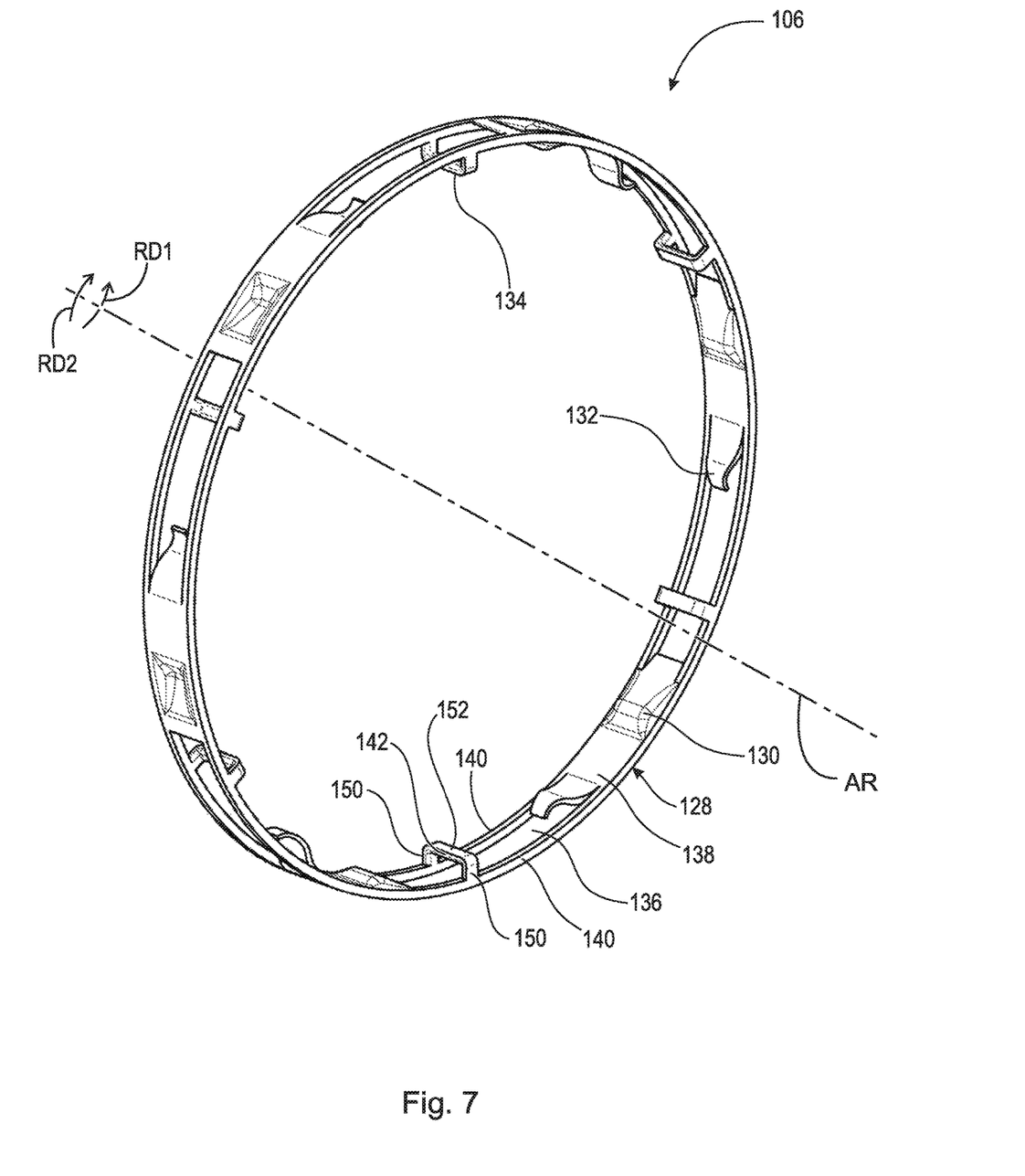
FIG. 7 is an isometric view of a cage shown in FIG. 1.

FIG. 7 is an isometric view of cage 106 shown in FIG. 1.

Figure 8:
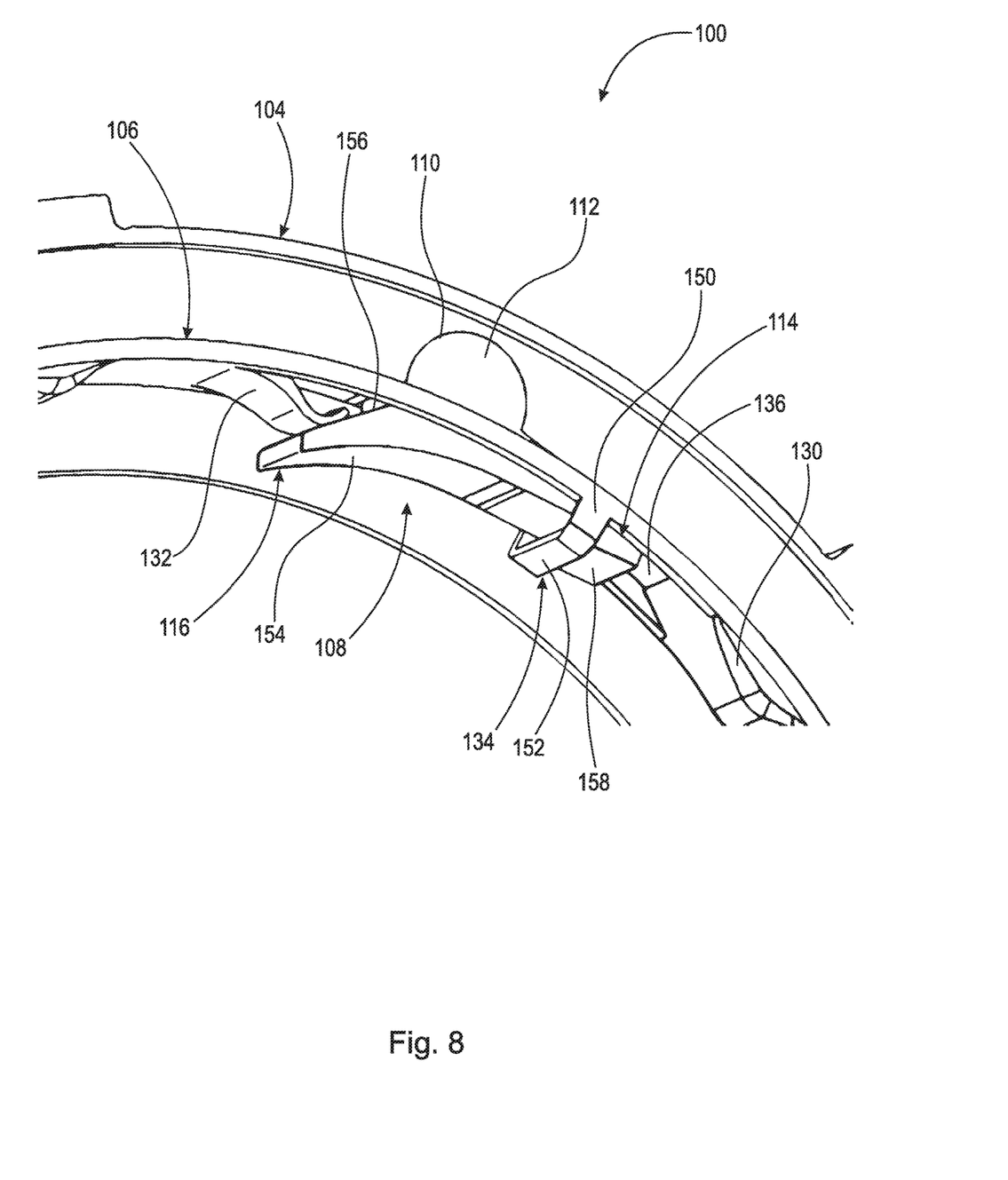
FIG. 8 is partial isometric view of the switchable three-mode clutch shown in FIG. 2 with an inner ring removed.

FIG. 8 is a partial isometric view of three-mode clutch 100 shown in FIG. 2 with inner ring 102 removed. The following should be viewed in light of FIGS. 1 through 8. Cage 106 includes: radially outermost portion 128; ramps 130 sloping radially inwardly from portion 128 in direction RD2; resilient elements 132 extending radially inwardly from portion 128; U-shaped straps 134 extending radially inwardly from portion 128; and openings 136 in portion 128. Portion 128 is circumferentially continuous and includes axially continuous portions 138 and connector portions 140. In an example embodiment, portion 128 is in contact with radially inner surface 141 of outer ring 104. Pawls 108 extend through openings 136. Respective straps 134 are circumferentially located between respective ramps 130 and resilient elements 132. For example, strap 134A is circumferentially located between ramp 130A and resilient element 132A.

Straps 134 are circumferentially located between a respective end 114 and a respective end 116 in the locking, one-way, and freewheel modes. For example, strap 134A is circumferentially located between end 114B and end 116A. In the locked and freewheel modes, ramps 130 contact pawls 108 and pawls 108 are free of contact with resilient element 132. In the one-way mode, pawls 108 are free of contact with ramps 130 and resilient elements 132 contact pawls 108. The circumferential positions of ramps 130, resilient elements 132, and straps 134 on cage 106 are fixed.

In the locked mode, cage 106 is in a first rotational position with respect to pawls 108 and outer ring 104. In the one-way mode, cage 106 is in a second rotational position with respect to pawls 108 and outer ring 104. In the freewheel mode, cage 106 is in a third rotational position with respect to pawls 108 and outer ring 104. The first, second, and third rotational position of cage 106 are different from each other. In an example embodiment, the third rotational position of cage 106 is between the first rotational position of cage 106 and the second rotational position of cage 106 in direction RD2. The rotational positions of the cage are further described below.

Since the circumferential positions of ramps 130, resilient elements 132, and straps 134 on cage 106 are fixed: in the locked mode, ramps 130, elements 132, and straps 134 are in respective first rotational positions with respect to pawls 108 and outer ring 104; in the one-way mode, ramps 130, elements 132, and straps 134 are in respective second rotational positions with respect to pawls 108 and outer ring 104; and in the freewheel mode, ramps 130, elements 132, and straps 134 are in respective third rotational positions with respect to pawls 108 and outer ring 104. The first, second, and third rotational positions of ramps 130, elements 132, and straps 134 correspond to the first, second, and third rotational positions of cage 106, respectively.

Straps 134 include edges 142 facing in direction RD2. The first, second, and third rotational positions of cage 106, ramps 130, elements 132, and straps 134 are illustrated by comparing: line L1, orthogonal to axis AR and passing through pivot axis PA for pawl 108C; line L2, orthogonal to axis AR and intersecting edge 142 of strap 134B; and angle 143, which is the smallest rotational angle between line L1 to line L2. Angle 143 is larger for the one-way mode than for the freewheel mode. The positions of lines L1 and L2 are reversed for angle 143 for the locked mode.

In the locked mode, portion 146 of ramp 130A is in contact with pawl 108B. In the freewheel mode, portion 148 of ramp 130A is in contact pawl 108B. Portion 146 is larger than portion 148. In the one-way mode, resilient elements 132 urge circumferential ends 116 radially inwardly into respective grooves 120. For relative rotation of inner ring 102, with respect to outer ring 104, in direction RD2, resilient elements 132 urge ends 116 into contact with respective walls 122.

U-shaped straps 134 include: radial segments 150 connected to portion 128 and extending radially inwardly from portion 128; and portions 152 connecting respective pairs of segments 150. Pawls 108 pass through U-shaped straps 134 such that portions 152 are radially disposed between pawls 108 and inner ring 102. Each pawl 108 includes radially inwardly facing surface 154 in contact with a respective U-shaped strap 134, in particular in contact with a respective portion 152.

The following provides further detail regarding the structure and function of clutch 100. The following is directed to the locked mode. To transition to the locked mode, shown in FIGS. 1 and 4, from the one-way mode (shown in FIGS. 2 and 5) or the freewheel mode (shown in FIGS. 3 and 6), actuator A rotates cage 106 in direction RD1, with respect to outer ring 104, such that ramps 130 contact and slide along pawls 108, in particular along radially outer surfaces 156 of pawls 108. Since ramps 130 slope radially inwardly in direction RD2 from portion 128 of cage 106, ramps 130 displace ends 114 radially inwardly into respective grooves 120 and between pairs of circumferentially adjacent teeth 118.

For example, ends 114 include protrusions 158 extending at least partly radially inwardly; and ramps 130 displace protrusions 158 radially inwardly into the respective grooves 120. In the locked mode, protrusions 158 are circumferentially disposed between walls 122 and 124 bounding the respective grooves 120. For example, wall 122B, protrusion 158A, and wall 124B are sequentially aligned in direction RD2 in FIGS. 1 and 4. Rotation of pawls 108 and outer ring 104 with respect to inner ring 102 is prevented for each of torques T1, T2, T3, and T4. Contact of ramps 130 with pawls 108 blocks pawls 108 from pivoting in direction PD1 about axis PA and prevents ends 114 from displacing radially outwardly.

The rotation of cage 106 in direction RD1 also slides U-shaped straps 134 along pawls 108, displacing ends 116 radially outwardly. If clutch 100 is transitioning from the one-way mode, U-shaped straps 134 displace ends 116 away from respective grooves 120. If clutch 100 is transitioning from the freewheel mode, U-shaped straps 134 displace ends 116 further away from inner ring 102. Straps 134 block pivoting of pawls 108 in direction PD1 in the locked mode.

The following is directed to the one-way mode. To transition to the one-way mode from the locked or freewheel modes, actuator A rotates cage 106 in direction RD2 with respect to outer ring 104. Ramps 130 rotate past pawls 108 in direction RD2 and out of contact with pawls 108. Resilient elements 132 contact pawls 108, in particular ends 116, rotate pawls 108 around axis PA in direction PD1, and push ends 116 radially inwardly.

In the transition to the one-way mode from the locked mode, U-shaped straps 134 slide along surfaces 154 displacing protrusions 158 radially outwardly and out of the respective grooves 120. In the transition to the one-way mode from the freewheel mode, U-shaped straps 134 slide along surfaces 154 displacing protrusions 158 further radially outwardly. Straps 134 prevent pawls 108 from pivoting around axis PA in direction PD2, opposite direction PD1.

Torque T1 in direction RD2 urges the respective walls 122 into contact with ends 116 to non-rotatably connect ring 102 and ring 104; and torque T4 in direction RD1 urges ends 116 into contact with the respective walls 122 to non-rotatably connect ring 102 and ring 104 Resilient elements 132 prevent ends 116 from displacing out of the respective grooves 120.

In the one-way mode, torques T2 and T3 cause ends 116 to dip into grooves 120 and slide along surfaces 126 without engaging walls 122. Sliding contact of ends 126 with walls 124 is possible, but does not block the relative rotation of inner ring 102 with respect to outer ring 104 in direction RD1.

The following is directed to the freewheel mode. To transition to the freewheel mode from the locked mode, actuator A rotates cage 106 in direction RD2 with respect to outer ring 104. Ramps 130 slide along pawls 108 in direction RD2 and decrease contact with pawls 108. Pawls 108 balance on U-shaped straps 134 to prevent contact of ends 114 and 116 with inner ring 102.

To transition to the freewheel mode from the one-way mode, actuator A rotates cage 106 in direction RD1 with respect to outer ring 104. Straps 134 slide along surfaces 154 of pawls 108, displacing ends 116 radially outwardly out of grooves 120 and out of contact with teeth 118. Pawls 108 balance on U-shaped straps 134 to prevent contact of ends 114 and 116 with inner ring 102.

The example of FIGS. 1 through 8 includes six each of: pawls 108, ramps 130; resilient elements 132; and U-shaped straps 134. However, it is understood that different numbers of pawls 108, ramps 130; resilient elements 132; and U-shaped straps 134 are possible for clutch 100.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

A actuator
AR axis of rotation

D1 distance
D2 distance
D3 distance
L1 line
L2 line
PA pivot axis
PD1 pivot direction
PD2 pivot direction
RAD1 radial direction
RAD2 radial direction
RD1 rotational direction
RD2 rotational direction
T1 torque
T2 torque
T3 torque
T4 torque
100 switchable three-mode clutch
102 inner ring
104 outer ring
106 cage
108 pawl
108A pawl
108B pawl
108C pawl
110 pocket
110A pocket
112 portion, pawl
114 circumferential end, pawl
114A circumferential end, pawl
114B circumferential end, pawl
116 circumferential end, pawl
116A circumferential end, pawl
118 tooth, inner ring
120 groove, inner ring
120A groove, inner ring
120B groove, inner ring
122 wall, tooth
122A wall, tooth
122B wall, tooth
124 wall, tooth
124A wall, tooth
126 surface, tooth
128 outermost portion, cage
130 ramp
130A ramp
132 resilient element
132A resilient element
134 U-shaped strap
134A U-shaped strap
134B U-shaped strap
136 opening, cage
138 axially continuous portion, cage
140 connector portion, cage
141 radially inner surface, outer ring
142 edge, strap
143 angle
146 portion, ramp
148 portion, ramp
150 radial segment, U-shaped strap
152 portion, U-shaped strap
154 radially inward facing surface, pawl
156 radial outer surface, pawl
158 protrusion
158A protrusion

The invention claimed is:

1. A switchable three-mode clutch, comprising:
an inner ring;
an outer ring including a pocket;
a cage radially disposed between the inner ring and the outer ring, rotatable with respect to the outer ring, and including a ramp sloping radially inwardly; and
a pawl including a portion disposed in the pocket, wherein, in a locked mode of the switchable three-mode clutch the ramp is in contact with the pawl and the inner ring and the outer ring are non-rotatably connected, in a one-way mode of the switchable three-mode clutch the cage is in contact with the pawl and relative rotation of the inner ring with respect to the outer ring is enabled only in a first rotational direction, and in a freewheel mode of the switchable three-mode clutch the ramp is in contact with the pawl and the inner ring is rotatable with respect to the outer ring in the first rotational direction and in a second rotational direction opposite the first rotational direction.

2. The switchable three-mode clutch of claim 1, wherein in the locked mode the pawl is non-rotatably connected to the inner ring, in the one-way mode the ramp is free of contact with the pawl, and in the freewheel mode the pawl is free of contact with the inner ring.

3. The switchable three-mode clutch of claim 1, wherein the portion of the pawl is non-rotatable with respect to the outer ring in the first rotational direction.

4. The switchable three-mode clutch of claim 1, wherein in the one-way mode the inner ring is non-rotatably connected to the outer ring for a torque applied to the inner ring in the second rotational direction, or for a torque applied to the outer ring in the first rotational direction.

5. The switchable three-mode clutch of claim 1, wherein the pawl includes a first circumferential end and a second circumferential end, in the locked mode the first circumferential end is in contact with the inner ring, and in the one-way mode the second circumferential end is in contact with the inner ring.

6. The switchable three-mode clutch of claim 1, wherein the pawl includes a circumferential end, the inner ring includes a plurality of teeth extending radially outwardly, and in the locked mode the circumferential end is in contact with the plurality of teeth and the plurality of teeth and the circumferential end are aligned in the first rotational direction.

7. The switchable three-mode clutch of claim 1, wherein the inner ring includes a tooth extending radially outwardly, the tooth includes a wall facing in the second rotational direction, and in the one-way mode and for a torque applied to the inner ring in the second rotational direction or for a torque applied to the outer ring in the first rotational direction, the pawl is in contact with the wall and the inner ring and the outer ring are non-rotatably connected.

8. The switchable three-mode clutch of claim 1, wherein the cage is arranged to be rotated with respect to the outer ring by an actuator, in the locked mode the ramp is in a first rotational position with respect to the pawl, and in the one-way mode the ramp is in a second rotational position with respect to the pawl.

9. The switchable three-mode clutch of claim 8, wherein in the freewheel mode the ramp is in a third rotational position with respect to the pawl, and the third rotational position of the ramp is between the first rotational position of the ramp and the second rotational position of the ramp in the first rotational direction.

10. The switchable three-mode clutch of claim 1, wherein in the locked mode, a first portion of the ramp is in contact with the pawl, in the freewheel mode a second portion of the ramp is in contact with the pawl, and the first portion is larger than the second portion.

11. The switchable three-mode clutch of claim 1, wherein the cage includes a resilient element extending radially inwardly, and in the one-way mode the resilient element urges the pawl into contact with the inner ring.

12. The switchable three-mode clutch of claim 11, wherein the resilient element is free of contact with the pawl in the locked mode and in the freewheel mode.

13. The switchable three-mode clutch of claim 11, wherein the cage includes a U-shaped strap extending radially inwardly, the U-shaped strap is located between the resilient element and the ramp in the first rotational direction, the pawl passes through the U-shaped strap, and the pawl includes a radially inwardly facing surface in contact with the U-shaped strap.

14. The switchable three-mode clutch of claim 1, wherein the cage includes a radially outermost portion, a resilient element extending radially inwardly from the radially outermost portion, and a U-shaped strap extending radially inwardly from the radially outermost portion; and wherein the ramp slopes radially inwardly from the radially outermost portion, the pawl passes through the U-shaped strap, the cage is arranged to be rotated with respect to the outer ring by an actuator, in the locked mode and the freewheel mode the pawl is free of contact with the resilient element, and in the one-way mode the resilient element is in contact with the pawl and pivots the pawl within the pocket and into contact with the inner ring.

15. A switchable three-mode clutch, comprising:
an inner ring;
an outer ring including a pocket;
a cage located between the inner ring and the outer ring, including a resilient element, and rotatable with respect to the outer ring by an actuator; and,
a pawl including a portion disposed in the pocket, wherein in a locked mode of the switchable three-mode clutch the resilient element is free of contact with the pawl and the pawl and the inner ring are non-rotatably connected, and in a one-way mode of the switchable three-mode clutch the resilient element urges the pawl into contact with the inner ring and relative rotation of the inner ring with respect to the outer ring is enabled only in a first rotational direction.

16. The switchable three-mode clutch of claim 15, wherein the cage includes a ramp, the inner ring includes a plurality of radially outwardly extending teeth, in the locked mode the ramp displaces the pawl into contact with the inner ring and into alignment with the plurality of radially outwardly extending teeth in the first rotational direction, in a freewheel mode of the switchable three-mode clutch the pawl is free of contact with the resilient element and is in contact with the ramp, and in the freewheel mode the inner ring is rotatable with respect to the outer ring in the first rotational direction and a second rotational direction opposite the first rotational direction.

17. The switchable three-mode clutch of claim 16, wherein the cage includes a U-shaped strap extending radially inwardly, the pawl passes through the U-shaped strap, and the pawl is disposed in the U-shaped strap for the locked mode, the one-way mode and the freewheel mode.

18. A switchable three-mode clutch, comprising:
an inner ring;
an outer ring including a pocket;
a cage including a ramp extending radially inwardly in a first rotational direction; and,
a pawl including a portion disposed in the pocket, wherein in a locked mode of the switchable three-mode clutch the ramp is in contact with the pawl and displaces the pawl into non-rotatable connection with the inner ring, and in a one-way mode of the switchable three-mode clutch the ramp is free of contact with the pawl and relative rotation of the inner ring with respect to the outer ring is enabled only in a second rotational direction opposite the first rotational direction.

19. The switchable three-mode clutch of claim 18, wherein the cage includes a resilient element extending radially inwardly; wherein in a freewheel mode of the switchable three-mode clutch, the ramp is in contact with the pawl, the pawl is free of contact with the resilient element, and the inner ring is rotatable with respect to the outer ring in the first rotational direction and the second rotational direction; and wherein in the one-way mode, the resilient element urges the pawl into contact with the inner ring.

20. The switchable three-mode clutch of claim 19, wherein the cage includes a U-shaped strap extending radially inwardly, the pawl passes through the U-shaped strap, and the pawl is disposed in the U-shaped strap for the locked mode, the one-way mode and the freewheel mode.

* * * * *